United States Patent
Peterson, III

(10) Patent No.: US 6,507,486 B2
(45) Date of Patent: Jan. 14, 2003

(54) WEARABLE COMPUTER AND GARMENT SYSTEM

(75) Inventor: Frederick A. Peterson, III, Centreville, VA (US)

(73) Assignee: Xybernaut Corporation, Fairfax, VA (US)

( * ) Notice: Subject to any disclaimer, the term of this patent is extended or adjusted under 35 U.S.C. 154(b) by 8 days.

(21) Appl. No.: 09/832,263

(22) Filed: Apr. 10, 2001

(65) Prior Publication Data

US 2002/0145849 A1 Oct. 10, 2002

(51) Int. Cl.$^7$ .................................................. G06F 1/16
(52) U.S. Cl. .................... 361/683; 361/730; 235/467; 708/140
(58) Field of Search ................................ 361/683, 684, 361/680, 686, 681, 730; 235/462, 472; 708/139, 140, 141, 142; D14/100, 102, 105, 107

(56) References Cited

U.S. PATENT DOCUMENTS

| | | |
|---|---|---|
| 4,876,724 A | 10/1989 | Suzuki |
| 5,162,148 A | 11/1992 | Boye et al. |
| 5,162,398 A | 11/1992 | Katz |
| 5,285,398 A | 2/1994 | Janik |
| 5,305,244 A | 4/1994 | Newman et al. |
| 5,416,310 A | 5/1995 | Little |
| 5,491,651 A | 2/1996 | Janik |
| 5,555,490 A | 9/1996 | Carroll |
| 5,572,401 A | 11/1996 | Carroll |
| 5,575,278 A | 11/1996 | Bonhomme et al. |
| 5,581,492 A | 12/1996 | Janik |
| 5,774,338 A | 6/1998 | Wessling, III |
| 5,798,907 A | 8/1998 | Janik |
| 5,844,656 A | 12/1998 | Ronzani et al. |
| 5,844,824 A | 12/1998 | Newman et al. |
| 5,864,481 A | 1/1999 | Gross et al. ................. 364/400 |
| 5,960,470 A | 10/1999 | Bachner |
| 6,249,427 B1 * | 6/2001 | Carroll ........................ 361/683 |

OTHER PUBLICATIONS

Izarek, Stephanie Wired Wear: The latest design Trend out of Europe. Fox News.com TechFront Sep. 21, 2000.

* cited by examiner

Primary Examiner—Darren Schuberg
Assistant Examiner—Hung Van Duong
(74) Attorney, Agent, or Firm—James J. Ralabate

(57) ABSTRACT

The present invention is an improvement on the functionality of garments of personal protection. The design is a portable computer system with all of the system components incorporated into an item of personal wear, for example into a garment such as a vest, that is shielded by a layer of armor. The armored garment will protect the user and completely house the processing unit, input device, and any peripheral attached to the processing unit.

18 Claims, 5 Drawing Sheets

WEARABLE COMPUTER AND GARMENT SYSTEM

TECHNICAL FIELD

The present invention relates to a wearable or body-worn computer or data input system and peripheral sensing devices wherein the system is incorporated into a garment intended to protect the wearer from threats to personal safety, such as from ballistic/puncture penetration, nuclear, biological, and chemical attack, perimeter penetration, presence of hostile threat, and personal vital signs/physical environment monitoring.

BACKGROUND ART

Military and law enforcement personnel are increasingly reliant on computing and communications equipment to enhance performance of their duties. An example of such, is the radio transceiver that is commonly attached to the shirt worn by police officers. Further, the military has moved into the realm of information-based warfare with its Command, Control, Communications, Computers, and Intelligence (usually referred to as $C^4I$) system that, inter alia, allow remotely located commanders the ability to monitor and control military personal in the field. The types of $C^4I$ peripherals military personal would need include tactical video or audio equipment, scent, sound, or motion detection, video or audio capture, radios, listening devices, IR detection, night vision equipment, etc. Additionally, personnel are often mandated to wear protective body armor, such a ballistic vest, while on duty or in an elevated threat environment.

Currently, an individual wearing a protective garment and wanting the functionality of a computer would have to attach or carry a wearable computer and peripheral devices appended to the garment or person of the wearer. The problems associated with this arrangement include the lack of protection from shock due to blunt force trauma, the lack of protection from environmental effects, and vulnerability due to exposed wires, and physical encumbrance.

One type of protective garment is a ballistic vest which has been available in recent years as a protective panel having overlying layers of a fabric typically thought not exclusively made from woven high tensile strength ballistic resistant polymeric fibers or other protective material. An example of such woven fabrics is KEVLAR which has been used successfully in military and law enforcement armored ballistic vests because of the high energy absorption properties of the fabric material. Many other types of body armor contemplated for use in the instant invention employ a multiplicity of fabrics, ceramics, and material intended to protect the wearer such as but not limited to those produced by Second Chance Body Armor of Central Lake, Mich. The MONARCH Ultra PRO by Second Chance Body Armor offers ballistic protection against 9 mm, 0.357's, 0.40 caliber, 0.44 magnum handguns, etc. Another type of body armor that could be used for the instant invention is the type sold by Point Blank Body Armor, Inc. of Oakland Park, Fla. Any other suitable material may be used if it possesses these desirable characteristics. However, these garments have not been constructed to take advantage of the benefits of wearable computers.

Also known in the art are protective materials designed to shield the wearer from puncture wounds. This type of assault is different then ballistic projectiles in that the energy of the penetrating object is focused over a much smaller surface area, such as the tip of an ice pick, nail, or like pointed object. An example of such is U.S. Pat. No. 5,960,470 (Bachner) which is sold under the trademark PRISM by Second Chance Body Armor of Central Lake, Mich. Bachner discloses a puncture resistant garment which includes a plurality of flexible layers of woven sheets positioned to overlie one another forming a puncture resistant panel, in which each of the plurality of woven sheets is constructed of aramid fibers and in which the woven sheets have a weave of at least 60 said aramid fibers per inch in one direction and at least 60 said aramid fibers per inch in another direction transverse to the first direction. Any other suitable material may be used if it possesses these desirable characteristics. Again, garments of this type have not been constructed to take advantage of the benefits of wearable computers.

A still further type of protective garment is one that protects from nuclear, biological, and chemical (NBC) attack. These garments range in the protection provided to the wearer from protecting the whole body to just covering the neck and w head of the individual. They are usually constructed of a composite material, such as several layers of different co-extruded or laminated plastics as is disclosed in U.S. Pat. No. 5,162,148. These garments also have not been constructed to take advantage of the benefits of wearable computers.

Wearable or user-supported personal computers are known in the art and are becoming increasingly important. Examples of user-supported personal computers include U.S. Pat. No. 5,305,244 (Newman I) which discloses a voice-activated, user-supported computer (mobile computer) and U.S. Pat. No. 5,844,824 (Newman II) which discloses a body-worn, hands-free computer system that does not rely upon keyboard input or activation apparatus both commonly assigned to Xybernaut Corporation of Fairfax, Va. The disclosures of these two commonly owned U.S. Pat. Nos. 5,305,244 and 5,844,824 are hereby incorporated by reference into this disclosure.

Also disclosing wearable computers are U.S. Pat. No. 5,285,398 (Janik I), U.S. Pat. No. 5,491,651 (Janik II), U.S. Pat. No. 5,581,492 (Janik III), U.S. Pat. No. 5,798,907 (Janik IV), U.S. Pat. No. 5,555,490 (Carroll I) and U.S. Pat. No. 5,572,401 (Carroll II). Each Janik patent discloses a belt computer containing the elements or components of a computer. For example, in Janik I, the plurality of computing elements are located on the belt and a flexible signal relaying means connects all of the elements for computing. A protective covering is used for enclosing said computer elements. In Janik II, a similar belt computer is described and claimed in which the signal relaying means, the length of which between any two computing elements, is greater than the length of the wearable member between any two computing elements. In each Janik patent, the flexible wearable computer is in the form of a relatively heavy belt comprising around its periphery sequentially positioned computer elements.

Both Carroll I and Carroll II disclose a wearable support and interconnection structure for a modular microcomputer system having a plurality of microcomputer cards housed in a plurality of microcomputer card pockets in a wearable garment. Examples of such garments include a pliable garment worn over the torso of the user (vest), a cap that fits snugly on user's head or in the form of a belt. In one embodiment, the pockets are linked by a plurality of channels extending from pocket to pocket that secure an electronic linking system to the wearable garment. The linking system includes a plurality of flat flexible cables encasing flexible circuitry and microcomputer card connectors. A card connector opens into each pocket to receive a microcomputer card. Each connector is operable, coupled to the cables such that when microcomputer cards are placed in the connectors and provided with power, an operational microcomputer system is created.

The wearable computers and garments of the Janik and Carrol patents are disclosed as being contained in a flexible or pliable housing. These are neither protected by a material that is resistant to penetration by ballistic projectiles nor integrated into a protective garment and therefore do not provide suitable level of protection for many law enforcement or military personnel activities.

Further examples of the incorporation of computing equipment and peripheral devices into a garment worn by the operator are discussed below. In U.S. Pat. No. 4,876,724, Suzuki describes a personal sound system concealed within garment, such as a jacket or vest. Specifically, the sound system is composed of battery power supply, amplifier, CD player, tape player, and loudspeakers which are distributed amongst various Velcro fastened or zipper fastened pockets formed on the front portion of the garment, on the sleeve, and on the back. Electrical cables to connect those components are run around the garment covered by a snap fastened or Velcro fastened fabric flap and thus not protected.

In U.S. Pat. No. 5,416,310, Little discloses a portable data input device or computer system comprising a display and processing module including input devices such as a keyboard or scanner which can be carried or secured to a garment, such as a vest. The system components can be housed in the pockets of the garment when not in use. When the system is in use, the display may be flipped up so that the operator may view the displayed data while the display in still in the pocket. System batteries are contained in one or more separate pockets in the garment and all signaling and power connections between various components are provided by flexible cabling incorporated into the garment.

In U.S. Pat. No. 5,774,338, Wessling III discloses a body integral electronics package housing formed of cloth material that simulates the user's garment, such as a poncho or vest, and contains a front pocket or flap that overlies the chest and midriff portions of the user's body. The electronics modules are confined within various pockets or flaps. Each module is individually supported to the cloth material within the pocket by hook and loop type fasteners or other appropriate type fasteners.

Further, Levi Strauss has recently teamed up with Phillips NV to create Levi's ICD+ which is a jacket that has a communication system built into it. The jackets are marketed to be more then just having special pockets for gadgets, but to offer a complete personal area network that acts as a backbone for connecting the electronics. The jacket has a communications system that connects a mobile phone, an MP3 player, speakers, microphone, and a display built into it. The wires are concealed under the fabric and the devices operate by a remote control unit.

However, the prior art garments which house computer systems lack intended ballistic and incision protection and ruggedness needed in many military and law enforcement applications where the computer components and/or the wearer needs to be protected from impact, shock, environmental hazards, field conditions, and tactical environment. Therefore, there is a need for the integration of a wearable computer and/or $C^4I$ peripheral equipment into a protective garment.

SUMMARY OF INVENTION

It is therefore an object of this invention to provide a wearable computer and garment system which is devoid of the above mentioned shortcomings.

It is also an object of this invention to provide a novel wearable computer and garment system.

It is an additional object of the present invention to integrate a wearable computer system with a garment of personal protection and or concealment.

It is a further object of the present invention to increase the functionality of a garment of personal protection by allowing the user access to a computer and/or computer peripherals.

It is still a further object of the present invention to improve the durability of a wearable computer and its components by adding armor, shock, and weather protection to the computer system.

It is yet an additional object of this invention to provide a novel wearable computer and garment system which protects the wearer from observation and bodily harm by projectile objects, sharp piercing objects and/or NBC attacks.

These and additional objects of the present invention are accomplished generally by a wearable computer system and/or $C^4I$ equipment with all of the system components incorporated into an item(s) of personal wear, for example into a garment such as a vest-like garment, protective jacket, etc. that is shielded by a layer of armor or protective fabric, material, composite substance intended to protect the wearer from threat. The outer fabric of the garment may be camouflaged or made of other types of material that provides concealment to protect the wearer from observation. The armored protective garment will completely support the processing unit, input device, and any $C^4I$ or peripheral attached to the processing unit wherein the components are restrained such that they will not accidentally become unattached from the garment, but can be selectively removed by the user.

One or more batteries, power supply, or power generation units contained in pockets or otherwise supported on the garment or wearer provide all operating power for the system. The cables or conductors may be sewn into channels or tracks in the garment, woven into the fabric of the garment, or otherwise conducted throughout the garment. Alternatively, the electrical connections can be wireless, i.e, Bluetooth or Bluetooth-like protocols, including any suitable type of electrical connection means or any known or future wireless protocols can be used.

In one embodiment of the present invention, a law enforcement, corrections officer or military person will wear the vest housing the components of the wearable computer and/or $C^4I$ peripherals. The person will be afforded the same level of protection provided by state-of-the art ballistic and/or penetration vests but will also have available access to computer and communication resources in a substantially hands free and non-burdensome manner. Preferably the components of the computer are distributed throughout the vest in a manner which optimizes comfort and balance of mass for the wearer, while minimizing any restriction of motion over a simple ballistic and/or penetration vest absent an integrated wearable computer system.

In an alternative to, or enhancement of the embodiment of the present invention, the garment may be a suit rather than a ballistic vest, such as a suit worn by a person working in an environment subject to ambient nuclear, biological, and/or chemical agents. In this embodiment, the suit will integrally contain the components of a wearable computer and/or $C^4I$ peripherals. The suit may accommodate the wearable computer equipment in a pocket configuration or the equipment may be integrated into the garment.

In the present invention a lightweight display is used including a head-mounted display, a flat panel display, a wrist display, a torso-worn display, a neck or collar mounted display, a shoulder-supported display and others or mixtures thereof. Each display could be wireless connected or hard wired connected to the computing unit as appropriate or configured suitable to functionality.

The foregoing and additional objects and advantages of the invention together with the structure characteristics thereof, which is only briefly summarized in the foregoing passages, becomes more apparent to those skilled in the art upon reading the detailed description and preferred embodiments, which follow in this specification, taken together with the illustration thereof presented in the representative accompanying drawings.

DETAILED DESCRIPTION OF THE INVENTION AND PREFERRED EMBODIMENTS

Figure 1:
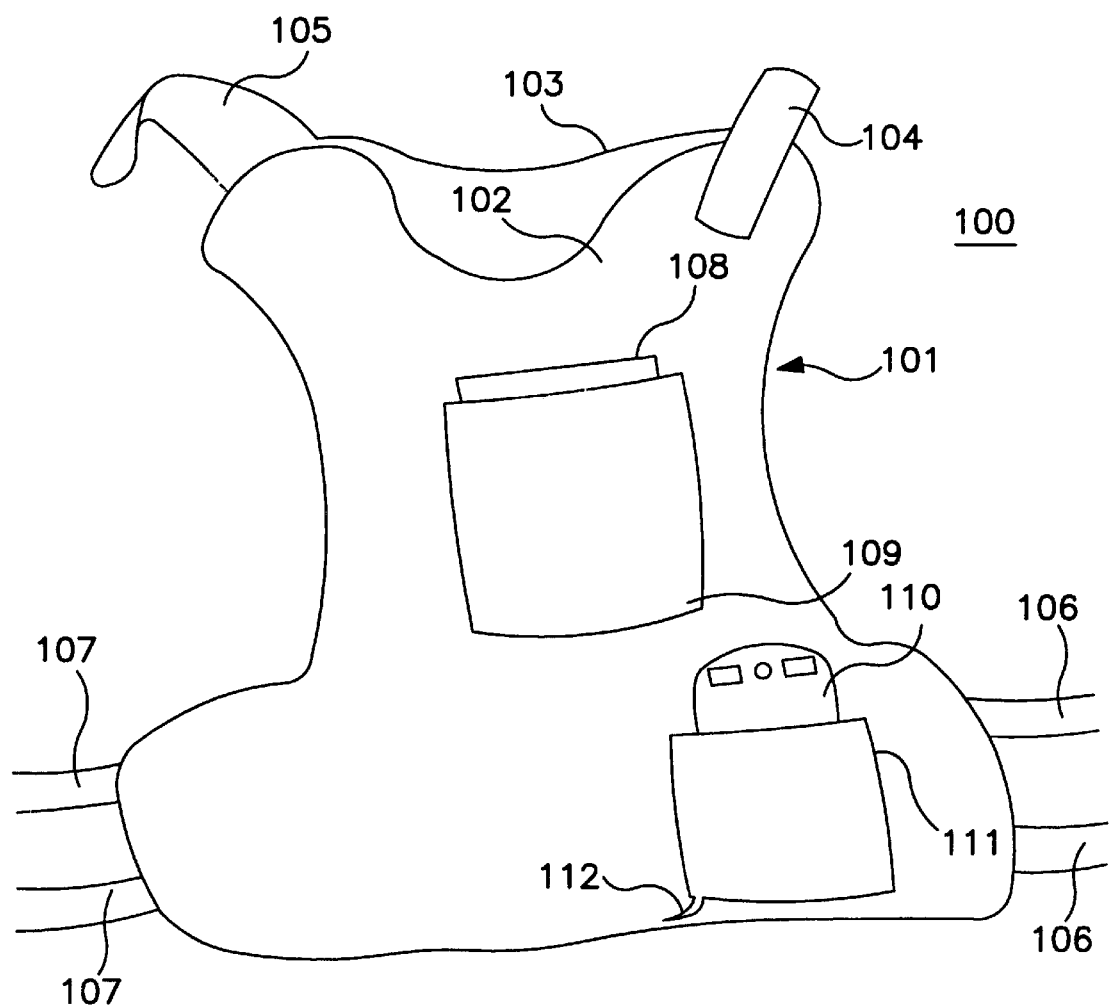
FIG. 1 illustrates a front perspective view of a first embodiment of the invention comprising a body armor vest incorporating a wearable computer and/or $C^4I$ peripherals.

Discussion of the invention will now be made with specific references to the drawing figures. FIG. 1 illustrates the first embodiment of the instant invention comprising a body armor vest incorporating a wearable computer 100. The body-armored vest is of a conventional design as far as the body armor and shoulder straps are concerned. The body armor is indicated generally by reference number 101 and consists generally of a front part 102 and a back part 103. These parts are supported on the wearer by shoulder straps 104 and 105 and are affixed around the wearer by side straps 106 and 107. The straps can have Velcro fasteners or any other clothing connection means to be used to secure the front and back parts together. The body armor is contemplated to be constructed to resist penetration of a bullet from gun fire and/or constructed to resist penetration from stabbing attacks with sharp pointed objects such as ice picks, awls, shanks, knives and the like. The body armor also has trauma protection chambers such as a breastplate 108 that fits into breastplate pocket 109. These trauma protection chambers provide additional levels of protection using soft or hard armor as well as penetration resistant material such as PRISM sold by Second Chance Body Armor, Inc. of Central Lake, Mich. The above construction of the body armor is only illustrative. One of ordinary skill in the art will appreciate that any type of armored garment could be used without departing from the spirit or scope of the invention.

The body armor also has additional pockets 111 to house a computing unit 110, battery, other computer components, or any $C^4I$ peripherals. By "computing unit" is meant a computer having all of the components of a conventional general-purpose computer, i.e., central processing unit, internal storage means, memory means, activation means, display controller, input/output means, peripheral connection means, etc. The general-purpose computer of this invention is the type disclosed in U.S. Pat. Nos. 5,305,244 and 5,844,824 and are hereby incorporated by reference. The cables 112 that provide power and transmit data are woven through the fabric of the garment or inserted into protective channels in the garment.

Figure 2:
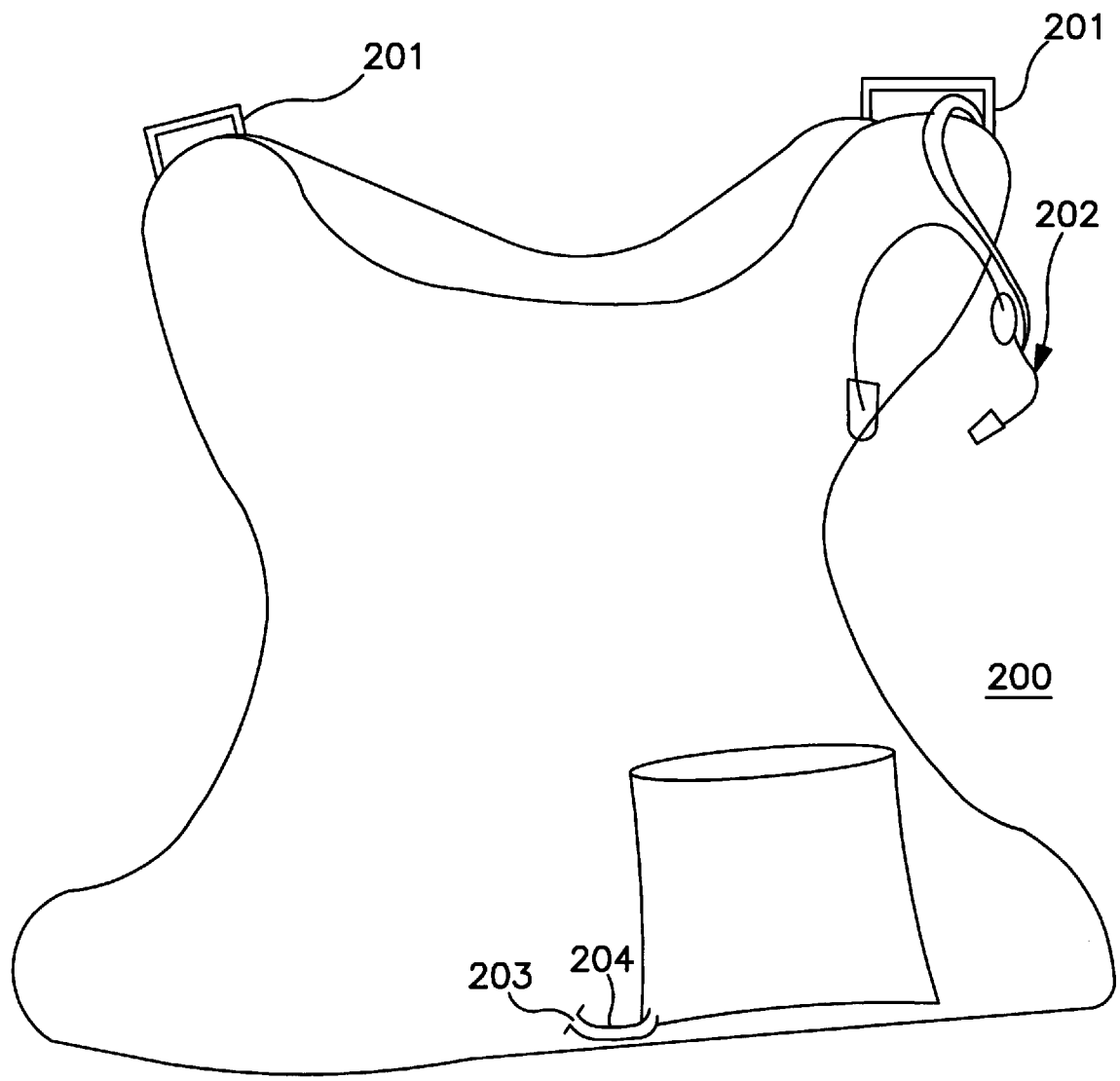
FIG. 2 illustrates a front perspective view of the first embodiment of the invention showing the uppermost portion of the body armor vest detailing the epaulettes and the channeling of the cables through the garment.

In FIG. 2 a front perspective view of the uppermost portion of the body armor vest 200 of the first embodiment detailing the epaulettes and the channeling of the cables throughout the garment is illustrated. Epaulettes 201 are sewn in each shoulder portion of the garment. The epaulettes allow a head mounted display (HMD) 202, microphone headset, or other equipment to be positioned within easy reach of the wearer. An example of the HMD is the type disclosed in U.S. Pat. No. 5,844,656 and is hereby incorporated by reference. Also shown in FIG. 2 is a channelized portion of the garment 203 in which all cables 204 are tracked. This will protect the cables from unnecessary exposure and will out of the user's way.

Figure 3:
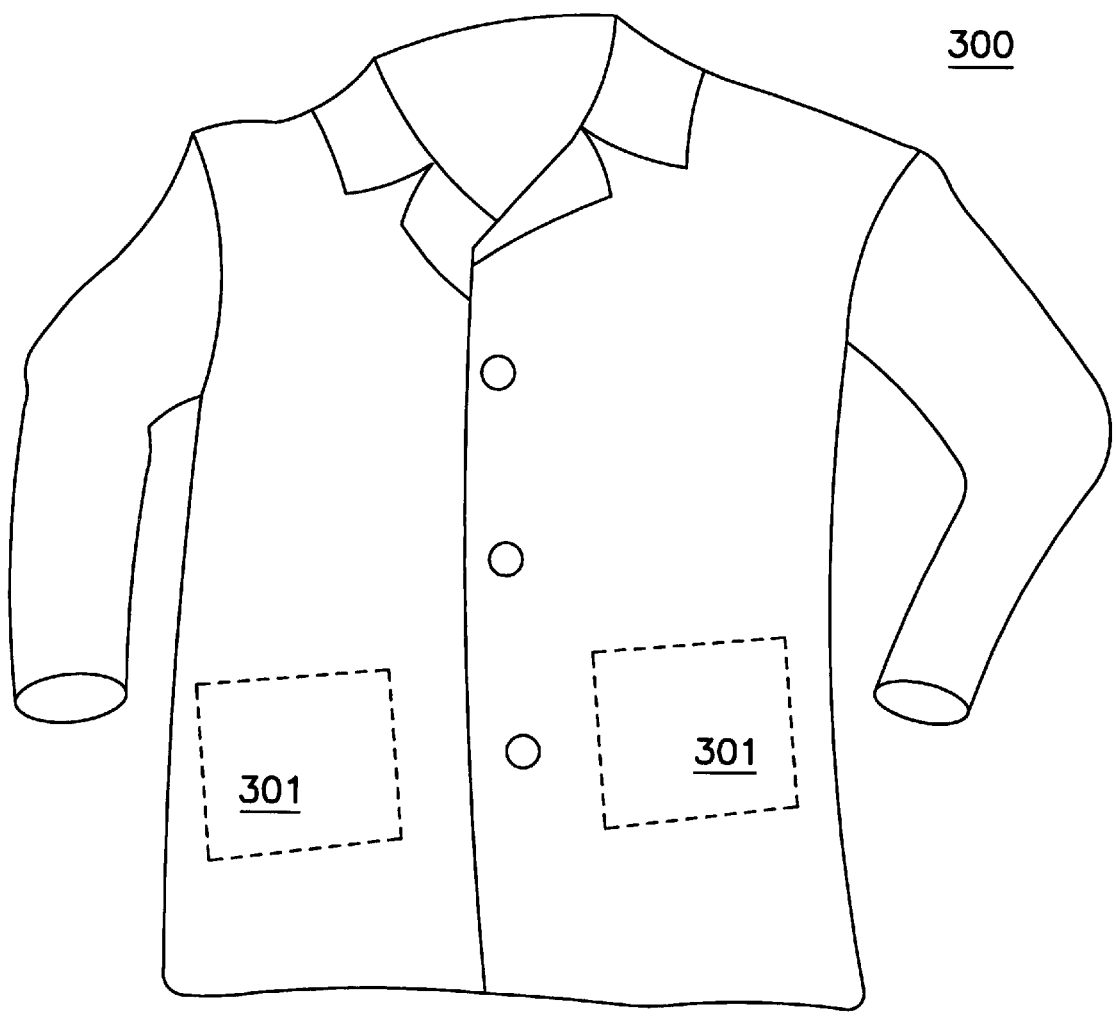
FIG. 3 illustrates an alternative embodiment of the invention comprising an armored jacket incorporating a wearable computer and/or $C^4I$ peripherals.

FIG. 3 illustrates an alternative embodiment of the invention comprising an armored jacket incorporating a wearable computer indicated generally by reference number 300. The jacket is of a conventional design encompassing form-fitting, waist-length, or trench coat length designs except that it is constructed to be lined with armored panels and support the computing system and/or $C^4I$ peripherals. The armor is of essentially identical construction as previously described above. The jacket has a plurality of pockets 301 as in the vest embodiment for housing the computing system and/or $C^4I$ peripherals.

Figure 4:
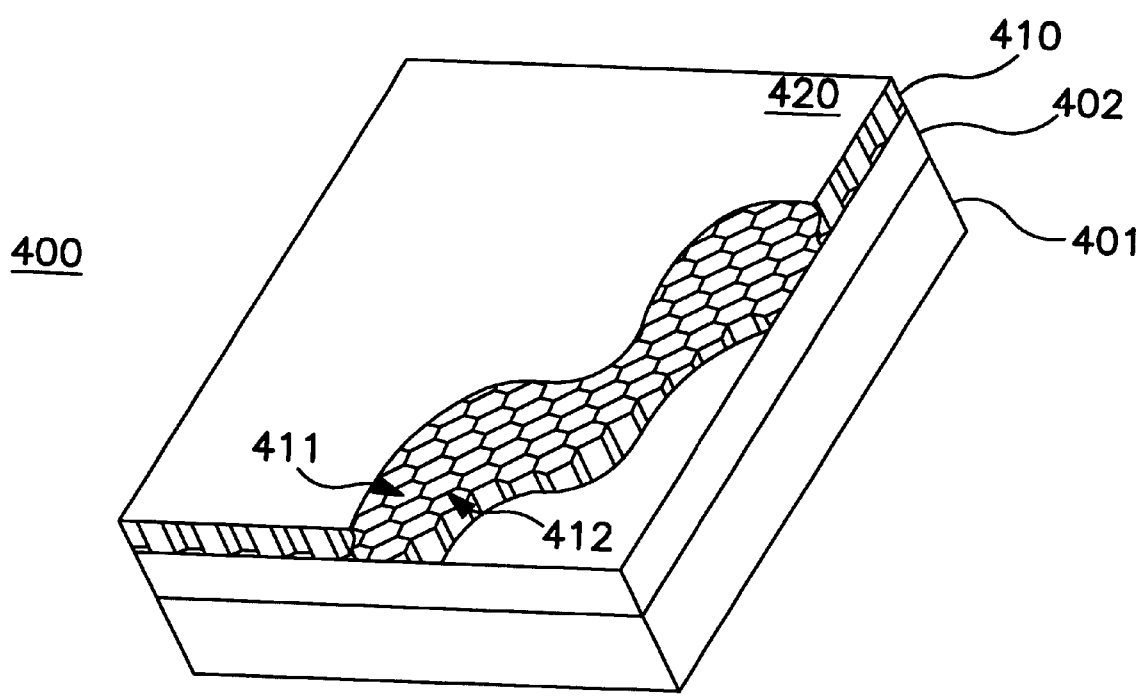
FIG. 4 illustrates a detailed view of the first embodiment of the invention showing an armored pocket that houses a wearable computer and/or $C^4I$ peripherals.

In FIG. 4 a detailed view of the armored pocket 400 that houses the wearable computer and/or $C^4I$ peripherals is illustrated. Alternatively, the armored pocket can house any $C^4I$ peripheral. The wearable computer 401 is protected by a three tiered system that is incorporated into the pocket. The first layer 402 is a layer of either soft or hard armor depending on the amount of protection desired. This layer will provide protection from blunt force and penetration type trauma as well as provide protection for wiring and other computer components. The type of body armor that is usable for this purpose are those sold by Second Chance Body Armor, Inc. and marketed under the names MONARCH Ultra PRO and MONARCH "+P+".

The second layer 410 is a lightweight flexible resilient composite material that is used to dissipate heat and to provide protection from shock. Preferably, materials that would be use include a thermoplastic polyurethane honeycomb sandwich sold by Hexel corporation of Plantation, California under the trademark TPU. The thermoplastic polyurethane honeycomb is advantageous because it is energy absorbing, flexible, impact resistant and light weight. Moreover, the flexible sheet of integrally fused hexagonally shaped open cells is fatigue resistant and resiliently returns to its original shape after impact with a blunt object. However, any other suitable material may be used if it possesses desirable characteristics. The flexible and resilient sheet 410 having honeycomb structures preferably is an integrally constructed arrangement of open hexagon shaped cells 411 which are fused together about the walls 412 of the cells 411 forming the thermoplastic polyurethane core. In order to provide adequate impact resistance against forces from striking blunt objects, approximately a 1/16 (0.0625) to 0.25 inch in diameter is a suitable range for the dimension across a single hexagon shaped cell. Sidewalls of the hexagonal shaped cells of thermoplastic polyurethane preferably range in height from approximately 0.25 to 0.5 inches.

The final layer 420 is a water/weatherproofing material such as Gore-Tex or other similar breathable material. This layer will protect the wearer and the electronics from adverse weather conditions.

Figure 5:
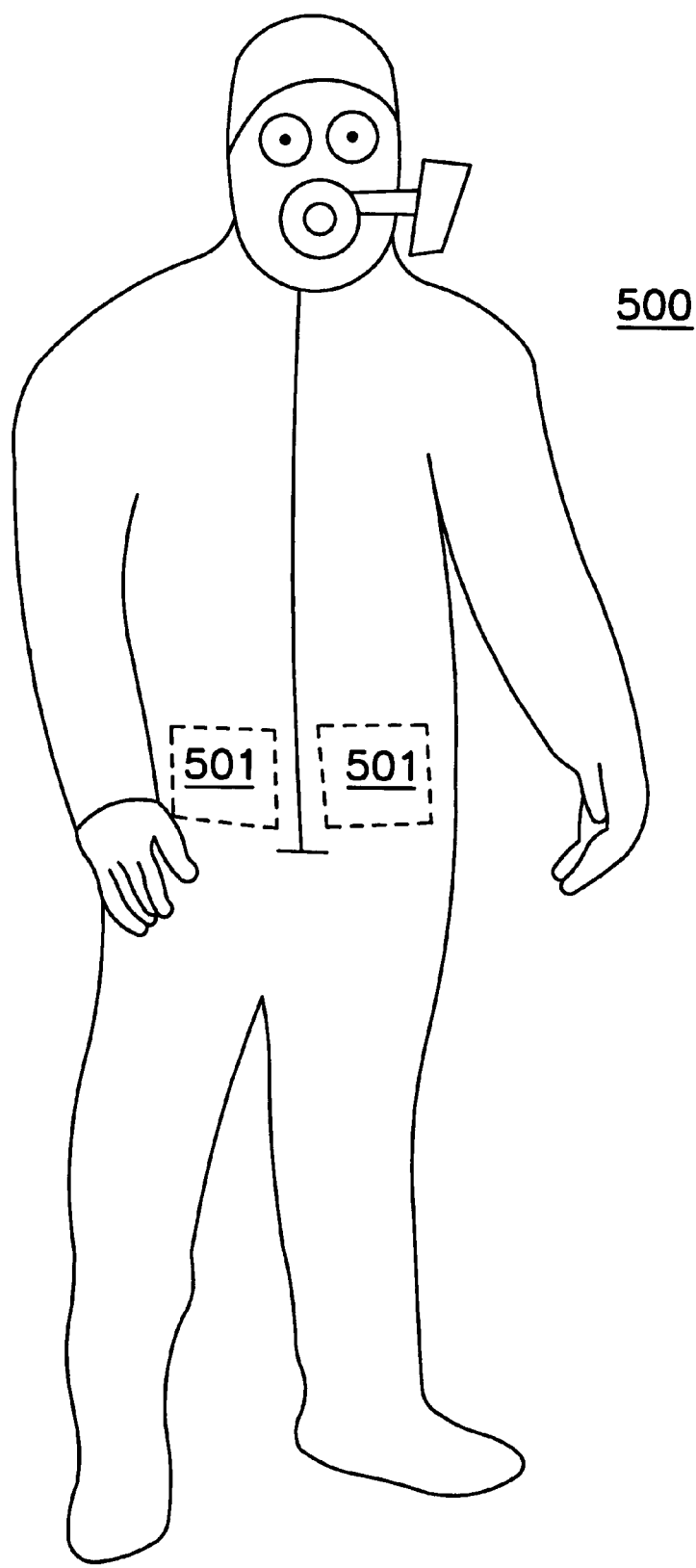
FIG. 5 illustrates an alternative embodiment of the invention comprising a garment that provides protection from nuclear, biological, and/or chemical attack and houses a wearable computer and/or $C^4I$ peripherals.

FIG. 5 illustrates an alternative embodiment of the invention comprising a garment supporting a wearable computer and/or $C^4I$ peripherals that protects the wearer and the wearer's computing equipment from nuclear, biological, and/or chemical threat. The computer-supported garment of this embodiment is indicated generally by reference number 500. The garment is of conventional design composed generally of a non-porous and non-foamed synthetic polymeric material, such as polyvinyl alcohol, polyvinyl pyrrollidone, acrylamide polymers, polyurethanes, etc. Any other non-porous material could be used that has a sufficiently high permeability to water to allow efficient thermal regulation of the body by natural sweat and heat elimination processes. The garment will be compounded with an additive such as activated charcoal and/or any other material capable of absorbing, detoxifying or reacting with noxious or toxic chemical or biological substances present in the surrounding atmosphere. The garment comprises a plurality of pockets shown generally as reference number 501. The pockets will completely house the wearable computer and/or $C^4I$ peripherals.

The present embodiments of this invention are thus to be considered in all respects as illustrative and not restrictive; the scope of the invention being indicated by the appended claims rather than by the foregoing description. All changes that come within the meaning and range of equivalency of the claims are intended to be embraced therein.

What is claimed is:

1. A system for housing a user-supported general-purpose computer and components and providing protection against threat to the user and to said computer, the system comprising:
   a garment comprising protective and heat dissipation material;
   a user-supported general-purpose computer, display unit, power supply, and cables connecting the computer to the components wherein the computer and components are attached to the garment and are protected from impact by said garment.

2. The system of claim 1 wherein the protective material has a primary protective property selected from the group consisting of ballistic resistive, puncture resistive, nuclear resistive, biological resistive, chemical resistive material, and mixtures therein.

3. The system of claim 1 wherein the garment is selected from the group consisting of a vest, a jacket, and mixtures thereof.

4. The system of claim 1 wherein electrical cables are woven throughout the garment.

5. The system of claim 1 wherein the components comprises a display unit.

6. The system of claim 2 wherein the protective material is camouflaged.

7. The system of claim 5 wherein the display unit is selected from the group consisting of a head mounted display, a flat panel display, a wrist display, a torso-worn display, a neck-hung display, a collar-mounted display, a shoulder-supported display, and mixtures therein.

8. The system of claim 7 wherein said head mounted display is capable of being selectively attached to an epaulette of the garment.

9. A method of protecting a user-supported general-purpose computer by integrating support structures for the computer into a ballistic vest, the method comprising the steps of:
   housing the computer in a pocket of the vest;
   adding a first layer of protection to the computer composed of a light-weight shock absorbing and heat dissipating composite material;
   adding a second layer of protection to the computer by either soft or hard armor;
   and adding a third layer of protection to the computer by utilizing a weatherproofing fabric.

10. A garment comprising a wearable computing unit and computer components incorporated into a ballistic vest wherein said vest includes material that is capable of dissipating heat from said computing unit.

11. The garment of claim 10 wherein the computing unit and computer components are connected by electrical cables which are interwoven through the garment.

12. The garment of claim 10 wherein the cables are protected by a layer selected from the group consisting of a weatherproofing fabric, a concealing fabric, a camouflage fabric and mixtures thereof.

13. Wearable body armor comprising in combination a wearable garment and a general purpose computer, said wearable garment constructed of a materials that are substantially resistant to penetration by ballistic projectiles and materials that exhibit heat dissipating properties, said general purpose computer selected from the group consisting of a single housed computer, separated computer components in electrical connection with each other and mixtures thereof, said garment containing pockets to house said general purpose computer and a battery, said general purpose computer having electrical connections to said battery and a wearer supported display.

14. The body armor of claim 13 wherein said garment is constructed of layers of material, at least one said layer being an armor protective layer and at least one of said layer being a weatherproof material.

15. The body armor of claim 13 wherein said display is selected from the group consisting of head mounted displays, flat panel displays, wrist mounted displays, neck hung displays and mixtures thereof.

16. The body armor of claim 13 wherein said electrical connection is a hard wire connection.

17. The body armor of claim 13 wherein electrical connection is a wireless connection.

18. The body armor of claim 13 wherein said wearable garment comprises communication means in electrical connection to said general purpose computer.

* * * * *